(12) United States Patent
Pepelyaev et al.

(10) Patent No.: US 12,609,641 B2
(45) Date of Patent: Apr. 21, 2026

(54) METHOD FOR STARTING A ROTOR OF A CLAW POLE MOTOR

(71) Applicant: Bühler Motor GmbH, Nuremberg (DE)

(72) Inventors: Igor Pepelyaev, Nuremberg (DE); Sören Rebel, Nuremberg (DE); Tobias Roth, Gunzenhausen (DE)

(73) Assignee: Bühler Motor GmbH, Nuremberg (DE)

( * ) Notice: Subject to any disclaimer, the term of this patent is extended or adjusted under 35 U.S.C. 154(b) by 259 days.

(21) Appl. No.: 18/496,254

(22) Filed: Oct. 27, 2023

(65) Prior Publication Data

US 2024/0056006 A1    Feb. 15, 2024

Related U.S. Application Data

(63) Continuation-in-part of application No. PCT/DE2022/200059, filed on Mar. 31, 2022.

(30) Foreign Application Priority Data

Apr. 27, 2021    (DE) ...................... 10 2021 110 687.7

(51) Int. Cl.
*H02P 6/182*    (2016.01)
*F04D 1/00*    (2006.01)
(Continued)

(52) U.S. Cl.
CPC .................. *H02P 6/20* (2013.01); *F04D 1/00* (2013.01); *F04D 13/06* (2013.01); *H02P 6/26* (2016.02); *H02P 2207/05* (2013.01)

(58) Field of Classification Search
CPC ... F04D 1/00; F04D 13/06; H02P 6/20; H02P 6/26; H02P 6/182; H02P 2207/05
(Continued)

(56) References Cited

U.S. PATENT DOCUMENTS 5,831,359 A * 11/1998 Jeske ..................... H02K 29/08
                                                                        310/68 B
2001/0004194 A1* 6/2001 Schmider ................. H02P 6/22
                                                                        318/400.26
(Continued)

FOREIGN PATENT DOCUMENTS

DE          41 22 109 A1    1/1993
DE       195 15 448 C1   12/1996
(Continued)

OTHER PUBLICATIONS

EP1465323 English Machine Translation (Year: 2004).*
(Continued)

*Primary Examiner* — Gabriel Agared
(74) *Attorney, Agent, or Firm* — WHDA, LLP

(57)    ABSTRACT

A method of starting a rotor of a single-phase claw-pole motor, wherein the claw-pole motor comprises a permanently excited rotor having a plurality of detent positions, wherein the rotor performs movement in a running direction in nominal operation, comprises an electronically commutated stator, and comprises a Hall sensor for determining relative rotor position is disclosed. The method comprises the steps of starting of the rotor by at least one commutation of a stator winding due to a Hall sensor signal and generating a plurality of commutations by means of pulse width modulated phase voltage based on a Hall sensor signal, wherein the Hall sensor is mounted on the stator or on an electronic circuit board and is arranged offset with respect to a center position of a stator pole in the direction of rotation.

9 Claims, 3 Drawing Sheets

(51) Int. Cl.
F04D 13/06 (2006.01)
H02P 6/20 (2016.01)
H02P 6/26 (2016.01)

(58) Field of Classification Search
USPC .................................................... 318/400.21
See application file for complete search history.

(56) References Cited

U.S. PATENT DOCUMENTS

| | | | | |
|---|---|---|---|---|
| 2004/0108789 | A1* | 6/2004 | Marshall ................... | H02P 6/16 |
| | | | | 310/216.016 |
| 2004/0145336 | A1 | 7/2004 | Marioni | |
| 2005/0253545 | A1* | 11/2005 | Dornhof ................... | H02P 6/26 |
| | | | | 318/434 |
| 2006/0119300 | A1* | 6/2006 | Armstrong ................ | H02P 6/10 |
| | | | | 318/400.04 |
| 2008/0018194 | A1* | 1/2008 | Kakugawa ................ | H02P 6/10 |
| | | | | 310/68 B |
| 2008/0231140 | A1 | 9/2008 | Popov | |
| 2012/0068642 | A1* | 3/2012 | Chen ......................... | H02P 6/26 |
| | | | | 318/400.11 |
| 2018/0138791 | A1 | 5/2018 | Sun et al. | |

FOREIGN PATENT DOCUMENTS

| | | |
|---|---|---|
| DE | 103 32 228 A1 | 2/2005 |
| DE | 10 2007 013 738 A1 | 9/2008 |
| DE | 10 2017 126 622 A1 | 5/2018 |
| DE | 10 2018 119 729 A1 | 2/2020 |
| EP | 0 216 202 A1 | 4/1987 |
| EP | 1 465 323 A2 | 10/2004 |
| EP | 2 701 291 A1 | 2/2014 |

OTHER PUBLICATIONS

Office Action dated Nov. 16, 2021, issued in counterpart German Patent Application No. 10 2021 110 687.7. (5 pages).
International Search Report dated Aug. 3, 2022, issued in counterpart International Application No. PCT/DE2022/200059. (3 pages).

* cited by examiner

METHOD FOR STARTING A ROTOR OF A CLAW POLE MOTOR

CROSS-REFERENCE TO RELATED APPLICATIONS

This present patent application is based on and claims priority to PCT Application No. PCT/DE2022/200059 filed on Mar. 31, 2022, which is based on German Application No. DE 10 2021 110 687.7 filed on Apr. 27, 2021, all of which are incorporated by reference in their entirety.

BACKGROUND OF THE INVENTION

(1) Field of the Invention

The invention relates to a method of starting a rotor of a single-phase claw-pole motor.

(2) Description of Related Art Including Information Disclosed Under 37 CFR 1.97 and 1.98

Pumps can be used, for example, in motor vehicles to convey and transport liquids, such as coolant. Usually, such pumps are operated by means of an electric drive which is in operative connection with the rotor of the pump. Single-phase claw-pole motors, which have a permanently excited rotor and an electronically commutated stator, can be used as the electrical drive. A Hall sensor is used to determine the relative rotor position, which is necessary to commutate the current in the stator winding to result in a rotary movement of the rotor.

Approximately due to windmilling effects, it can happen that the detent position of the rotor is unfavorable, so that it could have difficulties in overcoming the counter-torque during the first commutation. Here, there is a risk of a false start of the pump, i.e., the start-up and movement of the rotor takes place against the running direction in nominal operation. There is also a risk of the pump starting incorrectly if the cogging torque is too low or there is a lot of friction.

BRIEF SUMMARY OF THE INVENTION

The object of the invention is to prevent a false start of a rotor of a pump, particularly in a single-phase claw-pole motor.

The method according to the invention is provided for starting a rotor of a single-phase claw-pole motor, wherein the claw-pole motor comprises a permanently excited rotor having a plurality of detent positions, wherein the rotor performs a movement in a running direction during nominal operation, and comprises an electronically commutated stator and a Hall sensor for determining the relative rotor position. The method includes the following steps:
a. starting of the rotor by at least one commutation of a stator winding due to a Hall sensor signal, and
b. generating a plurality of commutations by means of pulse width modulated phase voltage based on a Hall sensor signal, wherein the Hall sensor is mounted on the stator or on an electronic circuit board and is arranged offset with respect to a center position of a stator pole in the direction of rotation.

BRIEF DESCRIPTION OF THE SEVERAL VIEWS OF THE DRAWINGS

The invention is also explained in more detail below with respect to further features and advantages by means of the description of exemplary embodiments and with reference to the accompanying drawings. In the figures.

DETAILED DESCRIPTION OF THE INVENTION

Figure 3:
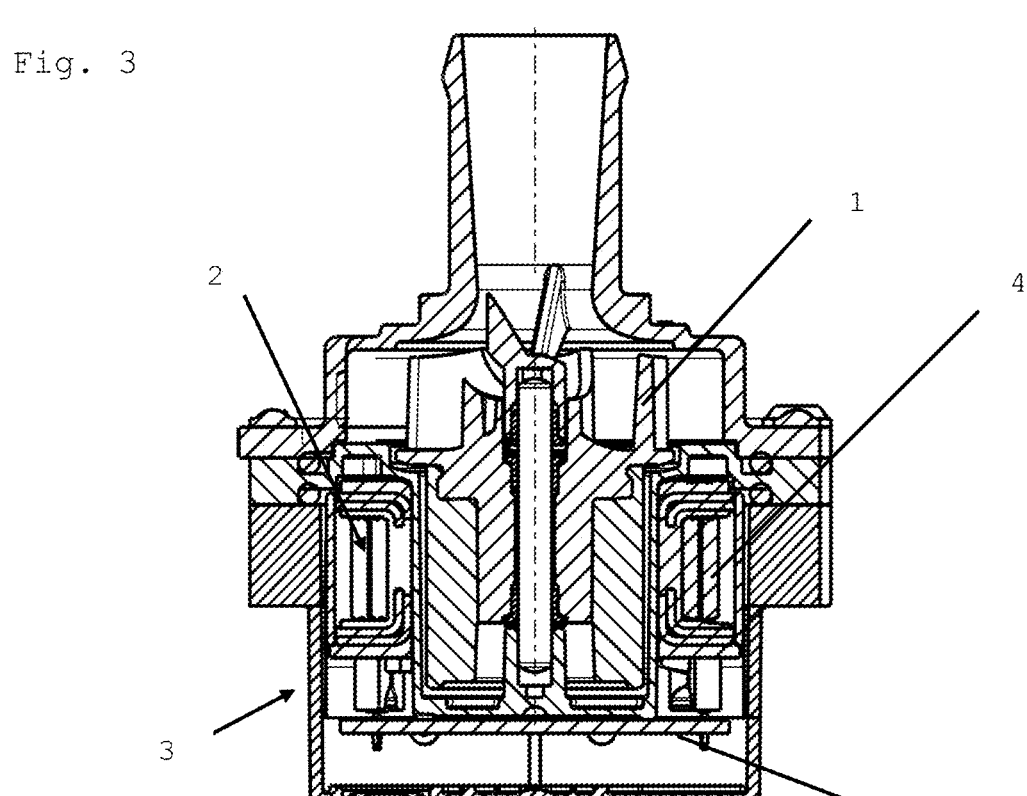
FIG. 3 is a cross-section drawing of a fluid pump.
Figure 4:
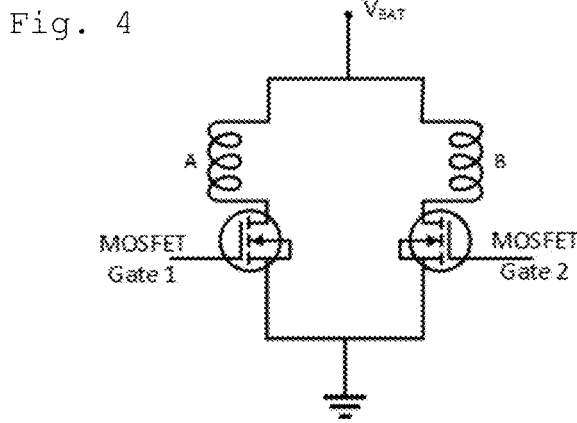
FIG. 4 is a circuit diagram of the circuit that operates the claw-pole motor.
Figure 5:
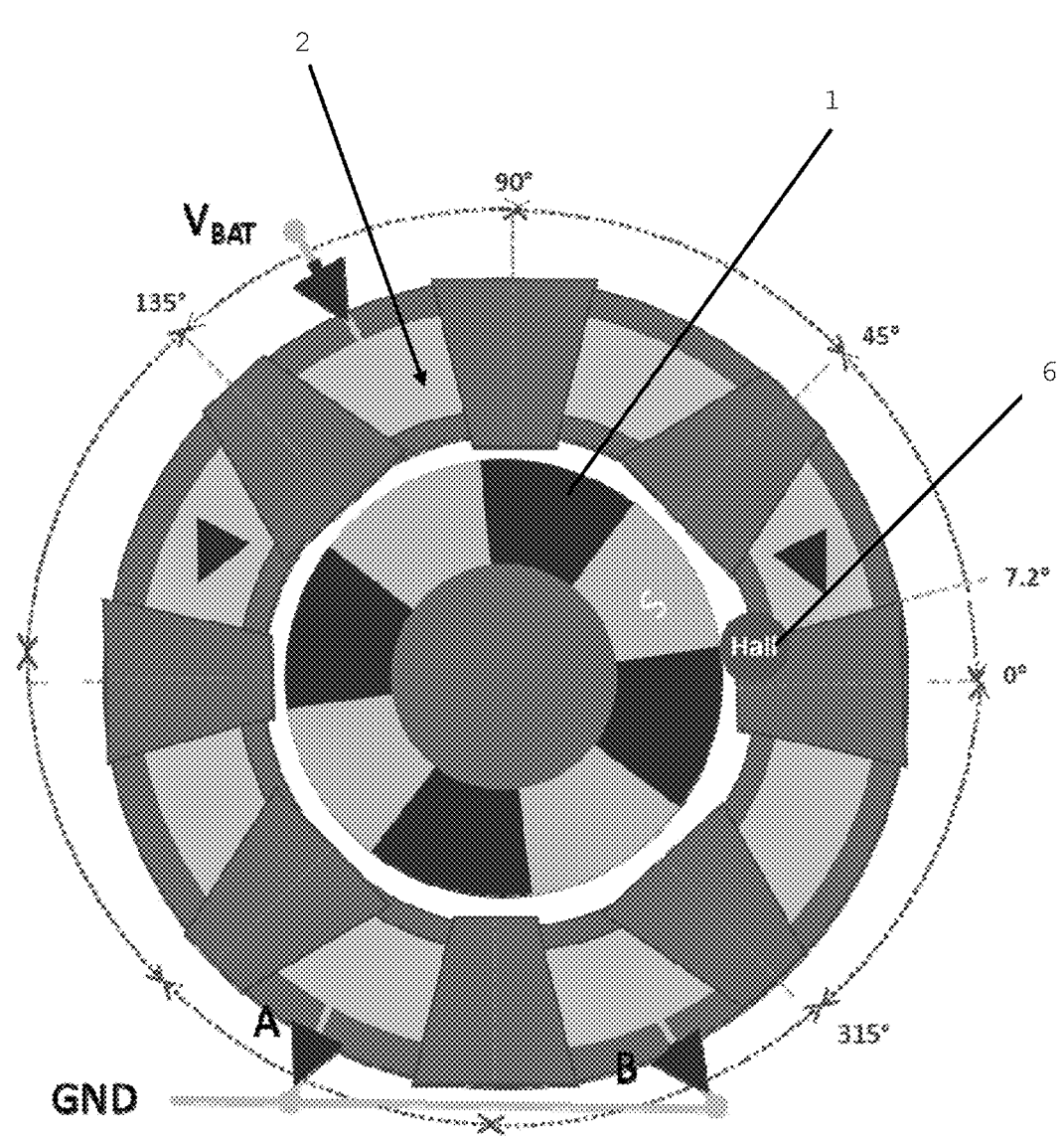
FIG. 5 is a plan view of the control of a single-phase claw-pole motor with Hall sensor based communication.

With reference to FIGS. 3-5, the method according to the invention is provided for starting up a rotor 1 of a single-phase claw-pole motor 3, wherein the claw-pole motor comprises a permanently excited rotor 1 which executes a movement in a running direction during nominal operation, an electronically commutated stator 2 and a Hall sensor 6 for determining the relative rotor position. The Hall sensor is connected to the stator and may be secured to a printed circuit board (PCB) 5.

The rotor of a pump can be locked in any number of locations, preferably 8 locations, by detents when it is de-energized. The pump electronics drive the pump taking into account the signals from a Hall sensor mounted on the stator or on an electronic circuit board and arranged offset in the direction of rotation with respect to a center position of a stator pole. The rotor position before start-up is defined by the cogging torque (defined by the magnetic circuit), friction and external moments (for example due to overflow of the hydraulic circuit). When starting from the rest position (detent position), the pump rotor must overcome the short motor counter-torque after the first commutation in the direction of rotation, i.e., sufficient rotational energy must be generated. If this does not succeed, a reversal of direction occurs and thus a false start of the rotor is possible. Furthermore, the commutation timing may be displaced (approximately due to magnetization of the magnets and the positioning of the Hall sensor) and lead to the same problem. When the rotor starts, at least one commutation of a stator winding is applied due to a Hall sensor signal.

Preferably, however, these are three commutations. A plurality of commutations are further generated by means of pulse width modulated phase voltage (PWM) based on a Hall sensor signal, wherein the Hall sensor is mounted on the stator or on an electronic circuit board and is arranged offset with respect to a center position of a stator pole in the direction of rotation. This results in a correct direction of rotation of the rotor. Conversely, this means that a false start of the rotor or the pump is advantageously prevented.

In accordance with an advantageous embodiment, a phase offset between phase voltage and phase current is present during several commutations by means of pulse width modulated phase voltage due to a Hall sensor signal. A phase shift in this context occurs when an AC voltage is applied to the stator winding. The mentioned phase shift depends on the applied current and the resulting speed of the rotor. Reducing the duty cycle of the pulse width modulated phase voltage reduces the applied current, resulting in a reduction of the phase offset. To a lesser extent, the speed of the rotor also changes.

Further preferably, the Hall sensor has an offset of preferably 28°.

In another advantageous embodiment, when the rotor moves against the direction of travel, the phase offset is greater than the offset of the Hall sensor.

In a further embodiment, when the rotor moves in the direction of travel, the phase offset is less than or greater than the Hall sensor offset.

In a further embodiment, a uniform and slow rotary movement of the rotor in the running direction and a preferably uniformly energized stator winding after each 180° movement of the rotor results in a predominant, positive torque and thus an acceleration. The phase offset here is smaller than the offset of the Hall sensor due to slow rotation of the rotor and uniform energization of the stator winding.

By applying multiple commutations by means of pulse width modulated phase voltage (PWM) pulses during start-up, rotation in an opposite or wrong direction of the rotor is prevented.

Furthermore, it can be provided that in case of a uniform and slow rotary movement of the rotor against the running direction and a preferably uniformly energized stator winding after each 180° movement of the rotor, a predominant negative torque and thus a braking and stopping of the rotor results. After stopping, the rotor immediately starts up in the direction of travel. The phase offset here is also smaller than the offset of the Hall sensor due to slow rotation of the rotor and uniform energization of the stator winding.

In another embodiment, a period of the pulse width modulated phase voltage is changeable based on a Hall sensor signal as a function of the voltage. In order to decouple the energy input in the winding and the effective effect on prevention/reduction of false starts from the dependence on the voltage supply, it is possible to change the pulse width modulated phase voltage (PWM pulses) depending on the voltage. These can be calculated or experimentally determined and known to a software algorithm used.

In a further embodiment of the invention, current is additionally applied to a stator winding by commutation of power electronics. The power electronics comprise electronic components such as MOSFET, IGBT or other corresponding electronic components known to the person skilled in the art.

The single-phase claw-pole motor is used in electric pumps, particularly in electric centrifugal pumps. However, other electric liquid pumps are also conceivable for the application.

Figure 1:
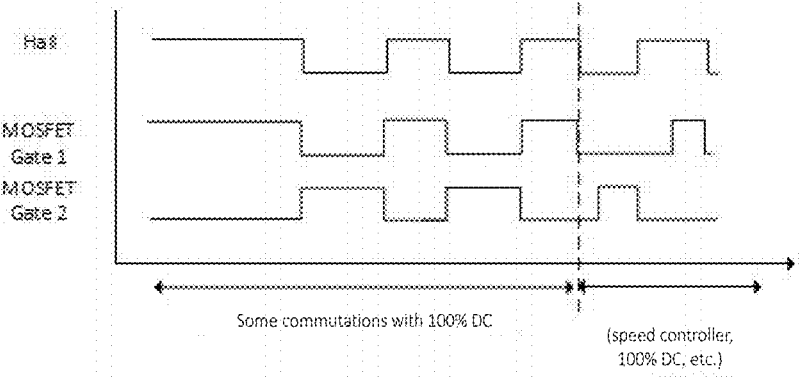
FIG. 1 shows a process flow diagram of a start-up of a single-phase claw-pole motor in accordance with the prior art.

FIG. 1 shows a process flow diagram of a start-up of a single-phase claw-pole motor in accordance with the prior art. The motor phases are commutated with 100% duty cycle with respect to the frequency of the Hall sensor at the start of the start-up phase, after which another mode of commutation can be selected, for example, 100% duty cycle continues or a controlled speed, or a controlled or regulated motor operation.

Depending on the rotor position (or: latching position, detent position, rest position) before start-up, the rotor can start in the correct or in the opposite running direction, which can result in a so-called false start. In other words, the rest position of the rotor before start-up is too close to a position of the first commutation point to apply enough kinetic energy during start-up to overcome the counter-torque.

The rotor position assumed by the rotor before start-up depends on the tolerances or inaccuracies on the following components:

Magnetization of the working magnet

Magnetization of the sensor magnet

Hall sensor positioning (displaces the commutation time in each case)

Stator geometry/material and processing (influence the detent)

The (weak) acceleration of the rotor during start-up from the rest position into the actually correct direction of movement is thus converted into braking energy during the movement, causing the rotor to brake and stop. As a result, an acceleration acts on the rotor against the direction of travel and a braking direction in the direction of travel so that the rotor moves against the direction of travel and a false start can occur.

Figure 2:
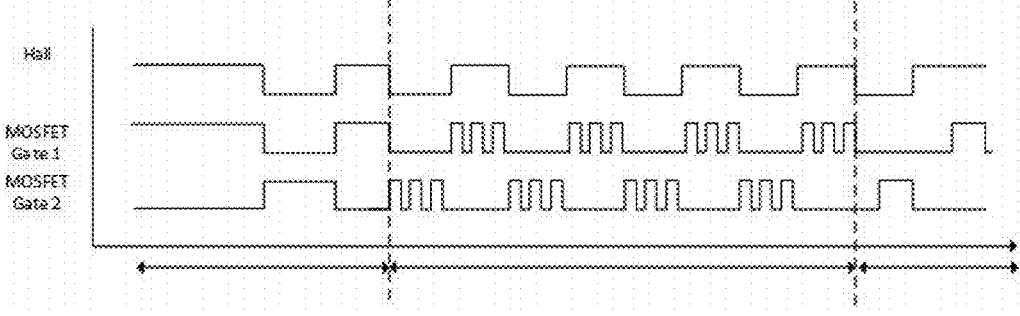
FIG. 2 shows a process flow diagram of a start-up of a single-phase claw-pole motor in accordance with the present invention.

FIG. 2 shows a process flow diagram of a start-up of a single-phase claw-pole motor in accordance with the present invention. A rotor of the single-phase claw-pole motor is started by at least one commutation of a stator winding based on a Hall sensor signal. During the start-up of the rotor, several commutations are generated by means of pulse width modulated phase voltage due to a Hall sensor signal.

When multiple commutations are generated by means of pulse width modulated phase voltage (PWM pulses) due to a Hall sensor signal, rotation in an opposite running direction (false start) is prevented.

Subsequently, any operation, for example, a duty cycle of 100% can be continued, or a controlled speed, or a controlled or regulated motor operation can be run.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A method of starting a rotor of a single-phase claw-pole motor, wherein the claw-pole motor comprises a permanently excited rotor having a plurality of detent positions, wherein the rotor performs movement in a running direction in nominal operation, comprises an electronically commutated stator, and comprises a Hall sensor for determining relative rotor position, wherein the method comprises the steps of:

a. starting of the rotor by at least one commutation of a stator winding due to a Hall sensor signal;

b. generating a plurality of commutations by means of pulse width modulated phase voltage based on the Hall sensor signal, wherein the Hall sensor is mounted on the stator or on an electronic circuit board and is arranged offset with respect to a center position of a stator pole in the direction of rotation, wherein when the rotor moves against the direction of travel, a phase offset is smaller than the Hall sensor offset.

2. The method according to claim 1, wherein during a plurality of commutations by means of pulse width modulated phase voltage there is a phase offset between phase voltage and phase current due to the Hall sensor signal.

3. The method according to claim 1, wherein the Hall sensor has an offset of preferably 28°.

4. The method according to claim 1, wherein when the rotor moves in the direction of travel, the phase offset is less than or greater than the Hall sensor offset.

5. The method according to claim 1, wherein with a uniform and slow rotary movement of the rotor in the running direction and a preferably uniformly energized stator winding after each 180° movement of the rotor, a predominant positive torque and thus an acceleration result.

6. The method according to claim 1, wherein with a uniform and slow rotary movement of the rotor against the running direction and a preferably uniformly energized stator winding after each 180° movement of the rotor, a predominant negative torque and thus braking results.

7. The method according to claim 1, wherein a period of the pulse width modulated phase voltage is changeable based on the Hall sensor signal as a function of the voltage.

8. The method according to claim 1, wherein the energization of a stator winding is additionally performed by commutation of power electronics.

9. The method according to claim 1, wherein the single-phase claw-pole motor is used in electric pumps, particularly in electric centrifugal pumps.

* * * * *